United States Patent [19]

Seabase

[11] Patent Number: 4,838,300
[45] Date of Patent: Jun. 13, 1989

[54] PRESSURE RELIEF CARTRIDGE

[76] Inventor: Peter P. Seabase, 1800 26th St., Cuyahoga Falls, Ohio 44223

[21] Appl. No.: 173,065

[22] Filed: Mar. 25, 1988

[51] Int. Cl.⁴ .............................................. F16K 17/04
[52] U.S. Cl. ................................ 137/224; 137/543.19; 137/454.5
[58] Field of Search .................... 137/224, 230, 543.19, 137/540, 454.2, 454.5

[56] References Cited

U.S. PATENT DOCUMENTS

| | | | |
|---|---|---|---|
| 1,882,215 | 10/1932 | Ewald | 137/224 |
| 2,876,982 | 3/1959 | Snider | 251/357 X |
| 3,057,115 | 10/1962 | Bilanin | 137/202 X |
| 3,086,549 | 4/1963 | Fino | 251/127 X |
| 3,511,475 | 5/1970 | Pfau | 251/357 X |
| 4,015,624 | 5/1977 | Wanstreet | 137/224 |

Primary Examiner—Alan Cohan
Attorney, Agent, or Firm—Renner, Kenner, Greive, Bobak, Taylor & Weber

[57] ABSTRACT

A pressure relief cartridge (10) for venting fluid to the atmosphere from a low pressure inflatable member including a housing (20) mounted in fluid-tight relation to the inflatable member, and having a base (21) and a projecting annular sidewall (22), an aperture (21') in the base of the housing communicates with the interior of the inflatable member, a poppet element (40) positioned within said annular sidewall of the housing has a plate (41) at an axial extremity thereof, a sealing element (43) on the plate is adapted to engage the base peripherally surrounding the aperture, an orifice (48) formed between the plate and the annular sidewall, a skirt (42) on the poppet projecting from the plate and interiorly communicating with the atmosphere, a slot (54) in the skirt, a retainer (60) positioned in the annular sidewall of the housing, and a biasing member (70) interposed between the retainer and the poppet element normally urging the sealing element to seat on the base and permitting the sealing element to unseat and vent fluid from the inflatable member through the orifice and the slot to the atmosphere when the fluid in the inflatable member exceeds a predetermined pressure.

19 Claims, 2 Drawing Sheets

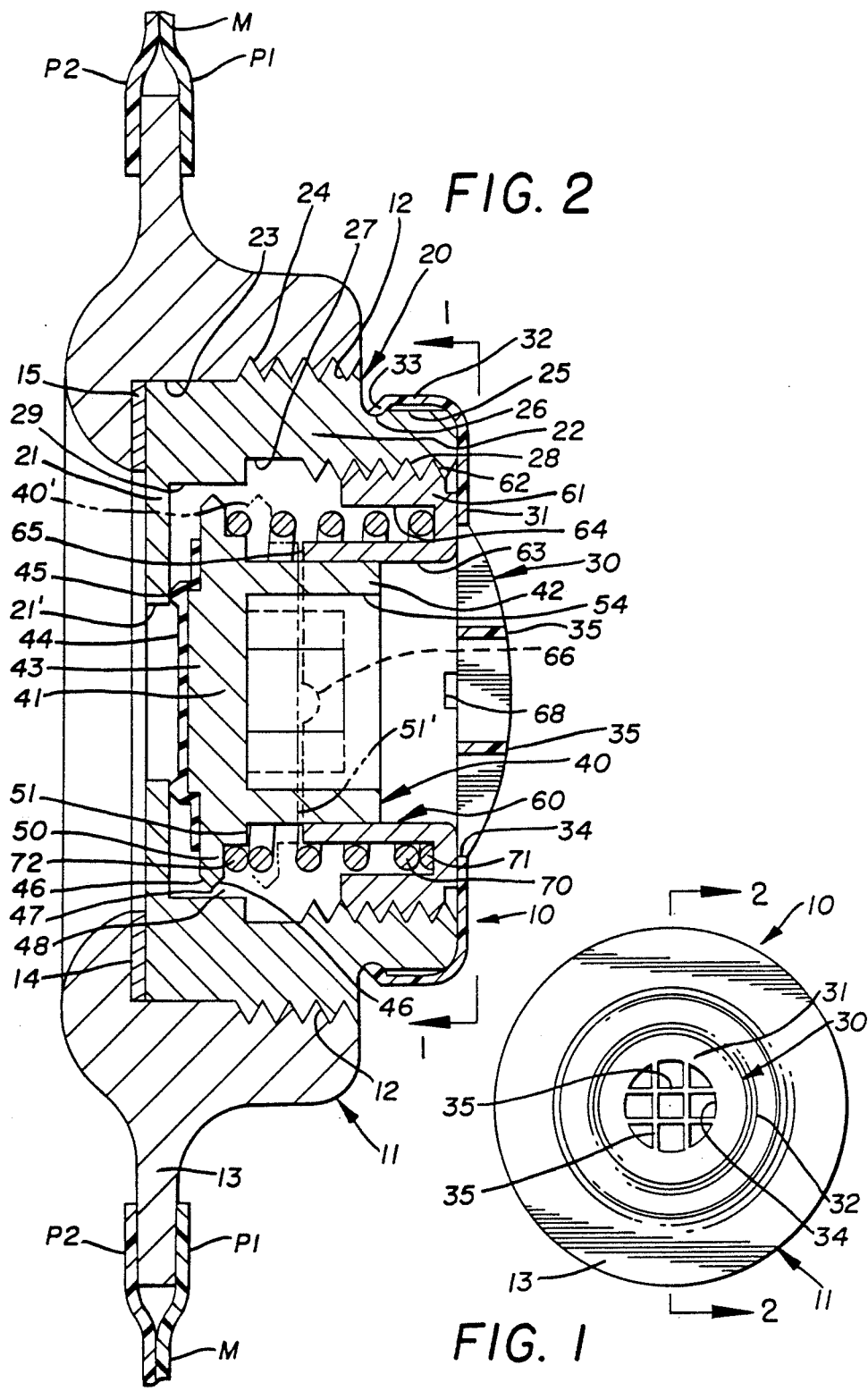

PRESSURE RELIEF CARTRIDGE

TECHNICAL FIELD

The present invention relates generally to a relief valve assembly for excess pressure protection for inflatable devices. More particularly the present invention relates to a low pressure relief valve for pressure protection for inflatable devices normally having a low fluid operating pressure but subject to possible high pressure fluctuations. More specifically, the invention relates to a pressure relief valve cartridge for venting excess pressure from fluid inflated devices such as life rafts, life jackets or vests which may intermittently unavoidably be subjected to shocks or blows causing rapid collapse or inadvertent overfill with fluid medium that may rupture seams or material in such inflatable members.

BACKGROUND ART

Various types of inflatable low pressure elastomeric devices have been used for flotation functions. These devices are commonly employed as life rafts, life jackets or vests and flotation bags. The extreme popularity of such inflatable members can be attributed to the fact that they are extremely lightweight as they can be manufactured of a relatively thin elastomeric membrane. Another advantage of such inflatable members is the fact that they are highly compact in that they can be stored in a deflated condition and inflated with air, carbon dioxide, nitrogen or other gases only in circumstances where they are to be employed. This is particularly significant since most inflatable devices of this type are employed only in emergencies which are normally rare occurrences.

While possessing the above and other highly advantageous traits these inflatable devices do exhibit certain disadvantageous features. One such feature is that in the event a substantial shock or blow is imparted to the inflatable device or in the event of overfill a failure of the material may occur. Such shocks or blows can be accidently imparted as by a person wearing an inflated life jacket or vest falling a substantial distance into water. Overfill may result from overheated inflation containers, overly high storage pressure, manual fill followed by automatic fill, or other improper operating procedure. The attendant shock or rapid collapse of the inflatable member can cause a rupture of the material itself, a failure at a seam joining pieces of material, a failure at a joint as where an inflating stem or other member may be attached to the inflatable member or more insidiously, an overstress which can lead to premature failure at a later time. In order to obviate the possibly disastrous results of such shock induced failures, such inflatable members are normally provided with a pressure relief device.

Pressure relief devices have been developed which are in the nature of a fitting which is attached to the inflatable member and which operates as a relief valve. While the inflatable members are capable of extended trouble-free operation at their designed pressure of approximately one to five psi, the relief valve must be capable of instantaneously venting fluid in the event that there is a gradual pressure overfill or a sudden shock induced pressure increase before failure of the inflatable member is induced. In addition to the requirement that the pressure relief cartridge permit rapid escape of fluid under shock loading, it is also essential that it be capable of rapidly closing after excess pressure has been vented or relieved in order to permit continuing safe operation of the inflatable member in a still inflated condition possessing much of the inflating fluid which is normally contained.

In most instances, pressure relief devices have consisted of relatively large metallic valves. In general, the valves consist of a heavy brass housing which encloses a floating diaphragm or poppet-tupe valve element. Normally, the inflatable members have a substantially rigid elastomeric member peripherally encompassing a hole in the inflatable member with the elastomer interfitting in a U-shaped peripheral groove in the relief cartridge housing which is swaged or bonded into sealing engagement with the elastomer. Such pressure relief cartridges in employing floating diaphragm or poppet elements normally have in the instance of diaphragms flat elastomeric sealing surfaces which are characteristically capable of only limited compression to effect sealing. In the case of poppet elements circular or O-ring sealing members are commonly employed; however, these sealing members also exhibit minimal compression and quickly become stiff upon compression resulting in diminished long-term sealing capability. As a result of the limited compression capabilities of these sealing devices, difficulties in obtaining repeatedly good seals have frequently been encountered in instances where there may be slight misalignment of the operating components, where they may be slight errors in component tolerances or where contamination or foreign material may reside on the seals or the seal engaging surfaces. In this respect it is to be appreciated that with the low pressures on the order of one or two psi normally present internally of the inflatable member and somewhat higher pressures existing when a relief valve is seating, the valve sealing elements receive substantially no assistance in seating or unseating from the operating pressure of the fluids.

An approach to achieving the objective of positive accurate sealing upon closure of the valve element is to employ sealing members of softer more pliable elastomeric materials. However, the use of softer, more pliable sealing materials inevitably results in increased probabilities of sticking or erratic adhesion between the sealing member and its seating surface thereby producing the possibilities of erratic or delayed opening of the valve which can result in an overstress or failure of the inflatable member. For the above and other reasons existing pressure relief cartridges for such inflatable members have characteristically encountered severe reliability problems which has necessitated frequent servicing and/or replacement of these pressure relief cartridges. In addition, many of the devices are not replaceable such that if they fail to meet operational test parameters the entire inflatable member must be discarded. Also, the existing devices normally are not pressure adjustable in that the tolerances of the operating parts must be relied upon exclusively to achieve the pressure relief tolerances for the device. Therefore, both the operating and replacement considerations involving existent pressure relief devices have proven to be less than satisfactory considering the critical function which these devices perform.

DISCLOSURE OF THE INVENTION

Therefore, an object of the present invention is to provide a pressure relief cartridge which is capable of accurate and consistent operation in a low pressure range of one to five psi with operating tolerance capability on the order of plus or minus one quarter psi. Another object of the present invention is to provide a pressure relief cartridge which is capable of long-term, highly reliable sealing without leakage. A further object of the present invention is to provide a pressure relief cartridge which can be stored or otherwise undergo extended periods of non-use and yet provide reliable operation at any time.

Another object of the invention is to provide a pressure relief cartridge employing a relief valve having a poppet element employing advanced sealing techniques. Yet another object of the present invention is to provide such a relief valve wherein the sealing element has a tapered point to provide more flexibility permitting increased compression to compensate for irregularities in the sealing surface, necessary or excess tolerances in parts or the presence of contaminating particles or foreign matter on the sealing element or the seating surface therefor. Still another object of the present invention is to provide such a relief valve wherein the sealing element may because of its geometry and the use of a softer, more pliable elastomer provide progressively stiffer seating to effect improved sealing characteristics.

Another object of the invention is to provide a pressure relief cartridge having a relief valve wherein the design of valve elements is such that the flow forces of escaping fluid assist in valve opening such that the valve is consistently and uniformly rapidly driven to a fully open position. A further object of the invention is to provide such valve elements where the flow forces allow variable flow rates to pass without significant changed in the pressure of relieving, thereby providing more consistent crack pressure at potentially high and low flow rates. Another object of the invention is to provide such a relief valve wherein the poppet element is maintained in a fully opened position against a fixed stop rather than floating on a spring or other biasing member. Yet another object of the invention is to provide such a relief valve wherein the valve element quickly cascades shut to insure accurate closure and sudden positive seating of the elastomeric sealing member on its seating surface.

Another object of the present invention is to provide a pressure relief cartridge which can be mounted in an elastomeric housing wherein the swaging or bonding of a metal to an elastomeric member is not required. Still another object of the invention is to provide a pressure relief cartridge which may be substituted in the housing of existing pressure relief devices as a replacement for the operating valve components. Yet another object of the present invention is to provide a pressure relief cartridge which may be used in a wide variety of low pressure relief applications.

Still another object of the present invention is to provide a pressure relief cartridge which is relatively small and lighrweight in comparison with existing devices. A further object of the invention is to provide a pressure relief cartridge wherein the principal valve elements may be constructed of a plastic which is not reactive to sea water or other corrosive environments. Another object of the invention is to provide such a pressure relief cartridge wherein smaller, lighter weight, moving components develop less inertia to achieve rapid yet accurate and cost effective performance. Another object of the present invention is to provide a pressure relief cartridge which despite reduced size and weight achieves equivalent or improved performance characteristics and reliability. Another object of the invention is to provide a pressure relief cartridge which is capable of being adjusted to specified pressure relief parameters to adjust for manufacturing variations and which may or may not permit subsequent calibration in the field depending upon the application and specified operating considerations.

In general, a pressure relief cartridge for venting fluid to the atmosphere from a low pressure inflatable member according to the concepts of the present invention has a housing mounted in fluid-tight relation to the inflatable member and having a base and a projecting annular sidewall, an aperture in the base of the housing communicates with the interior of the inflatable member, a poppet element positioned within the annular sidewall of the housing has a plate at an axial extremity thereof, a sealing element on the plate is adapted to engage the base peripherally surrounding the aperture, an orifice formed between the plate and the annular sidewall, a skirt on the poppet projecting from the plate and interiorly communicating with the atmosphere, a slot in the skirt, a retainer positioned in the annular sidewall of the housing, and a biasing member interposed between the retainer and the poppet element normally urging the sealing element to seat on the base and permitting the sealing element to unseat and vent fluid from the inflatable member through the orifice and the slot to the atmosphere when the fluid in the inflatable member exceeds a predetermined pressure.

BRIEF DESCRIPTION OF THE DRAWINGS

FIG. 1 is a top plan view of a pressure relief cartridge embodying the concepts of the present invention shown in a mounting block of a type attachable to an inflatable member and showing particularly the protective cap.

FIG. 2 is an enlarged sectional view of the pressure relief cartridge and mounting block taken substantially along the line 2—2 of FIG. 1.

PREFERRED EMBODIMENT FOR CARRYING OUT THE INVENTION

Figure 3:
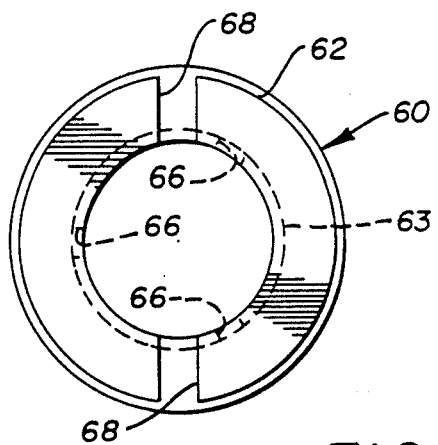
FIG. 3 is a top plan view of the pressure relief cartridge portion of FIG. 1 with the protective cap removed and depicting particularly the retainer member.

A pressure relief cartridge for venting fluid to the atmosphere from a low pressure inflatable member according to the concepts of the present invention is generally indicated by the numeral 10 in FIGS. 1 and 2 of the attached drawings. The pressure relief cartridge 10 is depicted installed in a mounting block, generally indicated by the numeral 11. As shown, the mounting block 11 is a generally annular member having threads 12 over a portion of the internal diameter thereof for a purpose to be hereinafter described. Extending circumferentially outwardly in all directions is a peripheral flange 13 which is adapted to be attached to material M constituting a portion of an inflatable member bounding an opening created therein for receiving the pressure relief cartridge 10. The material M may have a plurality of plies, P1 and P2 overlying an underlying flange B, respectively. Both the mounting block 11 and the material M may be of any of a variety of chemically bondable elastomers or thermoplastic materials which may be heat sealed to form a fluid-tight juncture between the material M and the flange 13 of the mounting block 11. Radially interiorly of the threads 12, the mounting block 11 forms a circular radial platform 14 for seating the pressure relief cartridge 10.

The pressure relief cartridge 10 is positioned and retained within the mounting block 11 by virtue of the numeral 20, of the pressure relief cartridge 10. As shown, the housing 20 which is somewhat cup-shaped has a base 21 which may be essentially circular and a projecting annular sidewall 22 defining a hollow cavity therein. The housing 20 and particularly the annular sidewall 22 are adapted to fit within the mounting block 11. A portion of the exterior surface 23 of the housing 20 has threads 24 adapted to matingly engage with the threads 12 positioned interiorly of the mounting block 11. The radially outer circumferential portion of the axially outer surface of base 21 of housing 20 seats on the circular radial platform 14 of the mounting block 11. A conventional gasket 15 may be interposed between base 21 and circular radial platform 14 in order to improve or effect a fluid-tight seal between the mounting block 11 and the housing 20 and, with the seal between material M and flange 13 of mounting block 11, between the housing 20 of cartridge 10 and material M of an inflatable member.

The annular sidewall 22 of housing 20 of pressure relief cartridge 10 has preferably proximate the axial extremity opposite the base 21 an annular collar 25 which is of reduced diameter with respect to the exterior surface 23. Axially inwardly of the collar 25 of the annular sidewall 22 has a groove 26 which is of lesser diameter than the collar 25.

The cup-shaped housing 20 is selectively enclosed at the extremity proximate collar 25 by a removable cap, generally indicated by the numeral 30. The cap 30 has a hub portion 31 which overlies the opening into the annular sidewall 22 of housing 20. Radially outwardly of the hub 31 the cap 30 has an axially projecting rim 32 which overlies the annular collar 25 of sidewall 22. The extremity of axial rim 32 terminates in a radially inwardly projecting lip 33 which is adapted to releasably interengage with the groove 26 in the annular sidewall 22. The cap 30 is of sufficiently flexible material such that the rim 32 may be deflected radially outwardly to displace the lip 33 from the groove 26 to permit attachment and detachment of the cap 30 from the housing 20 for purposes of gaining access to the components to be described hereinafter located interiorly of the housing 20. Centrally of hub 31 of cap 30 is an aperture 34 which is of sufficient size to permit free flow of substantial quantities of fluid from the interior of housing 20 to the atmosphere. As shown, a plurality of bars 35 extend across the aperture 34 and may be placed in an intersecting or other configuration as seen in FIG. 1 for purposes of allowing free flow of liquid through the aperture 34 while precluding the admission of solid foreign matter of any significant size which could adversely affect the operation of the cartridge 10.

The sidewall 22 of housing 20 has an internal bore 27 defining a portion of the hollow cavity therein. Over a portion of the bore 27 axially displaced from the base 21 are threads 28 which are employed for a purpose to be hereinafter described. The bore 23 in the area proximate the base 21 and axially displaced from the threads 28 has a reduced diameterstepped portion 29 which extends from the base 21 a distance axially toward the threads 28. The base 21 of housing 20 has preferably centrally thereof a circular aperture 21' extending therethrough which permits the communication of air from internally of the inflatable member to the hollow cavity internally of the housing 20.

Figure 4:
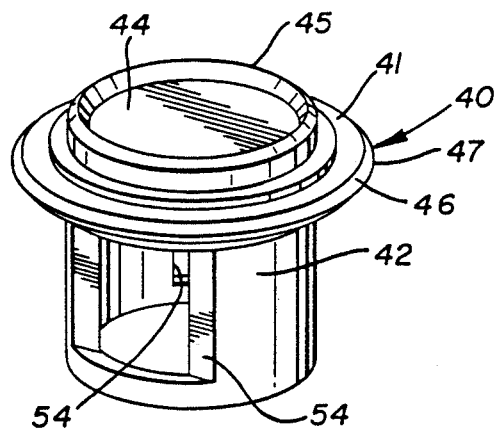
FIG. 4 is a perspective view of the poppet element of the pressure relief cartridge of FIG. 1 depicting the sealing member and other structuradl details.

Positioned within the hollow cavity of housing 20 as defined by the bore 27 and the reduced diameter stepped portion 29 is a poppet element, generally indicated by the numeral 40, as seen in reference to FIGS. 2 and 4 of the drawings. The poppet element 40 is a generally cup-shaped configuration which consists of a plate 41 and a skirt 42 extending axially therefrom. The plate 41 includes a projecting circular nose portion 43 having a radial dimension greater than the diameter of the circular aperture 21' of the housing 20. As best seen in FIG. 2, the circular nose 43 has its axis coincident with the center of the circular aperture 21' of housing 20. The plate 41 and particularly the nose 43 carries a sealingmember 44 which may extend across the surface of the nose 43 to a position a distance radially outwardly of the nose and onto the plate 41 at a position displaced radially outwardly of aperture 21' in base 21 of housing 20. Sealing member 44 is attached as by an adhesive to nose 43 and base 21. At a location radially outwardly of aperture 21' the sealing member 44 has an annular tapered or pyramidal projection 45 which is positioned to engage the axially interior surface of base 21 of housing 20. The tapered projection 45 is advantageous in terms of configuring a sealing surface which permits a substantial extent of compliance or deflection to optimize the sealing effect without excessive pressures. This configuration is also advantageous in terms of having the capability of deflecting or displacing as may be necessary to effectively sealingly engage the surface of base 21 irrespective of possible irregularities in the surface thereof or the presence of contaminating particles or foreign materials attached to or reposing on the surface.

The plate 41 of poppet element 40 is a circular configuration and has at the radially outer surface thereof tapered surfaces 46 which meet at a knife edge 47 at the axial extremity of the plate 41. The knife edge 47 forms with the stepped portion 29 of housing 20 a narrow annular orifice 48 extending circumferentially about knife edge 47.

The plate 41 has on the side axially opposite sealing member 44 a portion having a diameter reduced from that of knife edge 47 consisting of an axially extending spring seat 50 and displaced slightly axially and radially inwardly therefrom a stop pad 51. The stop pad 51 terminates axially inwardly in the projecting skirt 42. The skirt 42 is a continuous axially elongate annular member, except for one or more slots 54 which are formed therein. As shown, two slots 54 are provided which are substantially diametrically opposite on the skirt 42 and extend axially from a position proximate the plate 41, or stop pad 51 thereof, to a position which is proximate to but spaced from the axial extremity of the projecting skirt 42 displaced from the plate 41. As shown, each of the slots 54 extend circumferentially through an angle of approximately 90° as best seen in FIGS. 2 and 4 for a purpose to be hereinafter described.

As seen in reference to FIGS. 2 and 3 of the drawings, the poppet element 40 is positioned, retained and guided during its movement within the housing 20 by a retainer, generally indicated by the numeral 60. The retainer is an annular member which has a generally U-shaped diametric cross-section as best seen in FIG. 2 of the drawings. The retainer 60 has an outer sleeve 61 which has threads 62 on the radially external surface thereof for purposes of engaging the threads 28 within the hollow cavity of the annular sidewall 22 of housing 20. The retainer 60 has an annular stop arm 63 which is radially spaced from and axially parallels the outer sleeve 61 at a distance therefrom sufficient to form a slot 64 therebetween. The slot 64 is for a purpose to be described hereinafter. The inner circumference of the stop arm 63 is of substantially the same diameter as the skirt 42 of poppet element 40 such as to operate as a guide sleeve therefor to maintain the poppet element 40 centered within the housing 20 throughout the extent of its axial travel. The axial extremity 65 of stop arm 64 is adapted to engage the stop pad 51 of poppet element 40 when the poppet 40 moves to the chain line position 40′ depicted in FIG. 2 of the drawings. With the stop pad 51 similarly displaced to the chain line position 51′ the extremity 65 of stop arm 63 is in engagement therewith to constitute a limit to the extent of axial movement of the poppet element 40. It is, of course, to be appreciated that the poppet is restrained in axial movement in the opposite axial direction by engagement of the sealing member 44 with base 21 of housing 20.

The stop arm 53 of retainer 60 has at the axial extremity 65 a plurality of circumferentially spaced notches 66. As best seen in FIGS. 2 and 3, the notches 66 may be semi-circular or of other linear or arcuate configuration. As shown, there are three notches 66 disposed at substantially 120° increments about the periphery of annular stop arm 63. The number and circumferential extent of the notches 66 is determined in a manner which interrelates with the slots 54 of the skirt 42 of poppet element 40. The design of notches 66 and slots 54 is such that with the poppet element 40 in the chain line position 40′ at least one of the notches 66 is circumferentially coincident with one of the slots 54 irrespective of the rotational positioning of the retainer 60 relative to the poppet element 40. Thus, fluid present interiorly of the skirt 42 is in communication with the interior of housing 20 and the annular orifice 48 either through the slots 54 or when the poppet element 40 is in the fully open position 40′ through at least one of the notches 66 and one of the slots 54.

Interposed between the poppet element 40 and the retainer 60 is a coil spring 70. In particular, one axial extremity 71 of spring 70 fits in the slot 64 of the retainer 60 and the second axial extremity 72 of spring 70 engages the spring seat 50 of poppet element 40. The spring 70 biases the poppet element 40 away from the retainer 60 such that the sealing member 44 is normally biased into engagement with the base 21 of housing 20. The poppet element 40 has its sealing element 44 and particularly the tapered projection 45 displaced away from the base 21 when the pressure of the fluid within the inflatable member acting on nose portion 43 of plate 41 exceeds the biasing force of the spring 70. At this point the poppet element 40 cracks open and fluid within the inflatable member passes the sealing element 44, operates on the enlarged area of plate 41 out to knife edge 47, passes through orifice 48 and slots 54 to the atmosphere. The increasing air flow and resultant increased displacement of poppet element 40 rapidly, sequentially effect a sudden opening to the fully open position depicted in chain lines at 40′ in FIG. 2. The poppet element 40 similarly quickly cascades shut when the pressure in the inflatable member is reduced below the biasing force of spring 70 to effect sudden, positive seating of the sealing member 44 on the base 21.

The biasing force that spring 70 exerts on the poppet element 40 may be set at a predetermined value for a particular pressure relief cartridge by adjusting the distance between the retainer 60 and the poppet element 40 which thus adjusts the extent to which the spring 70 is compressed. This adjustment is effected by moving retainer 60 axially within the housing 20 and more particularly by threading or unthreading the threads 62 on outer sleeve 61 with respect to the mating threads 24 internally of the housing 20. The threading rotation of the retainer 60 relative to the housing 20 may be facilitated as by the provision of a pair of aligned slots 68 in the retainer 70 which may be engaged by a screw driver or other tool to facilitate the application of torque. The position of the retainer may remain subject to later adjustment or an adhesive might be applied to threads 62 and 28 to preclude rotation of the retainer and adjustment of the biasing force after a desired spring setting calibration has been effected.

Thus it should be evident that the pressure relief cartridge disclosed herein carriers out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A pressure relief cartridge for venting fluid to the atmosphere from a low pressure inflatable member comprising, housing means mounted in fluid-tight relation to the inflatable member, said housing means having base means and projecting annular sidewall means, aperture means in said base means of said housing communicating with the interior of the inflatable member, poppet means positioned within said annular sidewall means of said housing means having plate means at an axial extremity thereof, sealing means on said plate means adapted to engage said base means peripherally surrounding said aperture means, orifice means formed between said plate means and said annular sidewall means, skirt means on said poppet means projecting from said plate means and interiorly communicating with the atmosphere, slot means in and extending only a portion of the axial length of said skirt means, retainer means positioned in said annular sidewall means of said housing means, and biasing means interposed between said retainer means and said poppet means normally urging said sealing means to seat on said base means and permitting said sealing means to unseat and vent fluid from the inflatable member through said orifice means and said slot means to the atmosphere when the fluid in the inflatable member exceeds a predetermined pressure.

2. A pressure relief cartridge for venting fluid to the atmosphere from a low pressure inflatable member comprising, housing means mounted in fluid-tight relation to the inflatable member, said housing means having base means and projecting annular sidewall means, aperture means in said base means of said housing communicating with the interior of the inflatable member, poppet means positioned within said annular sidewall means to said housing means having plate means at an axial extremity thereof, sealing means on said plate means adapted to engage said base means peripherally surrounding said aperture means, orifice means formed between said plate means and said annular sidewall means, skirt means on said poppet means projecting from said plate means and proximately communicating with the atmosphere, retainer means positioned in said annular sidewall means of said housing means, and biasing means interposed between said retainer means and said poppet means normally urging said sealing means to seat on said base means and permitting said sealing means to unseat and vent fluid from the inflatable member by said sealing means and through said orifice means to the atmosphere when the fluid in the inflatable member exceeds a predetermined pressure, said sealing means including an annular tapered projection having a point engaging said base means and permitting compression for sealing at low pressures.

3. A pressure relief cartridge according to claim 2, wherein said plate means has a projecting circular nose, said sealing means being mounted on said nose.

4. A pressure relief cartridge for venting fluid to the atmosphere from a low pressure inflatable member comprising, housing means mounted in fluid-tight relation to the inflatable member, said housing means having base means and projecting annular sidewall means, aperture means in said base means of said housing communicating with the interior of the inflatable member, poppet means positioned within said annular sidewall means of said housing means having plate means at an axial extremity thereof, sealing means on said plate means adapted to engage said base means peripherally surrounding said aperture means, orifice means formed between said plate means and said annular sidewall means, skirt means on said poppet means projecting from said plate means and proximately communicating with the atmosphere, retainer means positioned in said annular sidewall means of said housing means, and biasing means interposed between said retainer means and said poppet means normally urging said sealing means to seat on said base means and permitting said sealing means to unseat and vent fluid from the inflatable member by said sealing means and through said orifice means to the atmosphere when the fluid in the inflatable member exceeds a predetermined pressure, said plate means is circular and has a radial periphery which is a knife edge formed by tapering surface means.

5. A pressure relief cartridge according to claim 2, including removable cap means enclosing the extremity of said sidewall means opposite said base means.

6. A pressure relief cartridge according to claim 5, wherein said cap means has aperture means permitting the free flow of air from the interior of said housing means to the atmosphere.

7. A pressure relief cartridge according to claim 6, wherein said cap means includes a plurality of bars extending across said aperture means to preclude the entry of foreign matter to said housing means.

8. A pressure relief cartridge according to claim 2, wherein said biasing means is a spring.

9. A pressure relief cartridge according to claim 8, wherein one axial extremity of said spring fits in a slot in said retainer means and the other axial extremity of said spring engages a seat on said poppet means.

10. A pressure relief cartridge for venting fluid to the atmosphere from a low pressure inflatable member comprising, housing means mounted in fluid-tight relation to the inflatable member, said housing means having base means and projecting annular sidewall means, aperture means in said base means of said housing communicating with the interior of the inflatable member, poppet means positioned within said annular sidewall means of said housing means having plate means at an axial extremity thereof, sealing means on said plate means adapted to engage said base means peripherally surrounding said aperture means, orifice means formed between said plate means and said annular sidewall means, skirt means on said poppet means projecting from said plate means and proximately communicating with the atmosphere, retainer means positioned in said annular sidewall means of said housing means, and biasing means interposed between said retainer means and said poppet means normally urging said sealing means to seat on said base means and permitting said sealing means to unseat and vent fluid from the inflatable member by said sealing means and through said orifice means to the atmosphere when the fluid in the inflatable member exceeds a predetermined pressure, said retainer means having sleeve means for guiding and centering said poppet means throughout the extent of its travel.

11. A pressure relief cartridge according to claim 10, wherein said sleeve means is formed by annular stop arm means having an extremity adapted to engage stop pad means on said poppet means constituting a limit to the axial travel of said poppet means displaced from engagement of said sealing means with said base means.

12. A pressure relief cartridge according to claim 11, wherein said retainer means has a second sleeve positioned radially outwardly of said stop arm means and forming slot means therebetween for receiving spring means of said biasing means.

13. A pressure relief cartridge according to claim 12, wherein said second sleeve means has external threads matingly engaging threads of said annular sidewall means of said housing means for selectively adjustably positioning said retainer means axially of said housing means, thereby permitting adjustment of the initial force which said biasing means imparts to said poppet means.

14. A pressure relief cartridge according to claim 13, wherein said retainer means has radial slots to facilitate threading rotation of said retainer means relative to said sidewall means to said housing means.

15. A pressure relief cartridge according to claim 10, wherein said retainer means has annular stop arm means serving as a guide sleeve encompassing said skirt means of said poppet means.

16. A pressure relief cartridge according to claim 15, wherein said annular stop arm means has notch means coincident with said slot means when said poppet means is in the fully open position.

17. A pressure relief cartridge according to claim 16, including a plurality of circumferentially spaced notches at the axial extremity of said stop arm means.

18. A pressure relief cartridge according to claim 17, wherein said slot means includes a plurality of slots with at least one of said notches being coincident with at least one of said slots irrespective of the rotational position of said poppet means relative to said retainer means.

19. A pressure relief cartridge according to claim 18, wherein said slots are openings extending a distance axially of sad spaced circumferentially about said skirt means and said notches are arcuate openings.

* * * * *

UNITED STATES PATENT AND TRADEMARK OFFICE
CERTIFICATE OF CORRECTION

PATENT NO. : 4,838,300

DATED : June 13, 1989

INVENTOR(S) : Peter P. Seabase

It is certified that error appears in the above-identified patent and that said Letters Patent is hereby corrected as shown below:

Col. 2, Line 8, "poppet-tupe" should read --poppet-type--

Col. 2, Line 28, "they" should read --there--

Col. 3, Line 34, "changed" should read --change--

Col. 3, Line 58, "lighrweight" should read --lightweight--

Col. 4, Line 45, "structuradl" should read --structural--

Col. 5, Line 6, after the word "the" (second occurrence) insert --configuration of the housing, generally indicated by the--

Col. 5, Line 30, "collar 25 of the" should read --collar 25 the--

Col. 5, Line 55, "liquid" should read --fluid--

Col. 6, Line 17, "sealingmember" should read --sealing member--

Col. 7, Line 22, "stop arm 53" should read --stop arm 63--

Col. 8, Line 19, "carriers" should read --carries--

Col. 8, Line 62, "to" should read --of--

UNITED STATES PATENT AND TRADEMARK OFFICE
CERTIFICATE OF CORRECTION

PATENT NO. : 4,838,300

DATED : June 13, 1989

INVENTOR(S) : Peter P. Seabase

It is certified that error appears in the above-identified patent and that said Letters Patent is hereby corrected as shown below:

Col. 10, Line 62, "sad" should read --and--

Signed and Sealed this

Twenty-third Day of July, 1991

Attest:

HARRY F. MANBECK, JR.

*Attesting Officer*   *Commissioner of Patents and Trademarks*